United States Patent [19]

Gale et al.

[11] 4,220,367
[45] Sep. 2, 1980

[54] VEHICLE REMOVABLE SECURITY CURTAIN

[75] Inventors: Thomas C. Gale, Rochester; Richard A. Graves, Bloomfield Hills; Mark Lobanoff, Troy, all of Mich.

[73] Assignee: Chrysler Corporation, Highland Park, Mich.

[21] Appl. No.: 15,379

[22] Filed: Feb. 26, 1979

[51] Int. Cl.³ ............................................. B60R 5/04
[52] U.S. Cl. ........................ 296/37.16; 160/323 R; 211/105.6; 248/268
[58] Field of Search .................. 296/37.16, 77; 150/52 K, 0.5; 248/268, 264; 211/105.6, 105.3; 160/323 R, 323 B, 224–226

[56] References Cited

U.S. PATENT DOCUMENTS

| 1,537,887 | 5/1925 | Savage | 296/37.16 |
| 3,304,034 | 2/1967 | Jones | 248/268 |
| 4,139,231 | 2/1979 | Lang et al. | 296/37.16 |
| 4,168,094 | 9/1979 | Yagi | 296/37.16 |

FOREIGN PATENT DOCUMENTS 2733165 2/1979 Fed. Rep. of Germany ........ 296/37.16

*Primary Examiner*—Robert R. Song
*Attorney, Agent, or Firm*—Baldwin & Newtson

[57] ABSTRACT

In a vehicle which has a luggage space visible through a hatchback type opening and formed between spaced sidewalls of the vehicle, an easily removable security curtain and support mechanism for the luggage space which is adapted to cover articles within the luggage space in overlying relation thereto. The security curtain includes an elongated strip of flexible material having a width generally equal to the distance between the spaced vehicle walls and with an end edge thereof attached to a rotatable support roller so that the curtain may be wrapped around the roller when in a retracted or stored operative position. The ends of the support roller are attached to the vehicle sidewall and supported thereby by means of cap members on the ends of the roller support in a manner permitting relative rotation therebetween. Each cap member includes an axially outwardly protruding nose portion which is received within a vertical channel of an associated receiving or mounting means which is attached to the vehicle sidewalls. At least one of the end cap members is biased by a spring, internal to the roller support, to permit yieldable inward and outward axial movement which movement facilitates insertion and removal of the nose within the channel.

5 Claims, 4 Drawing Figures

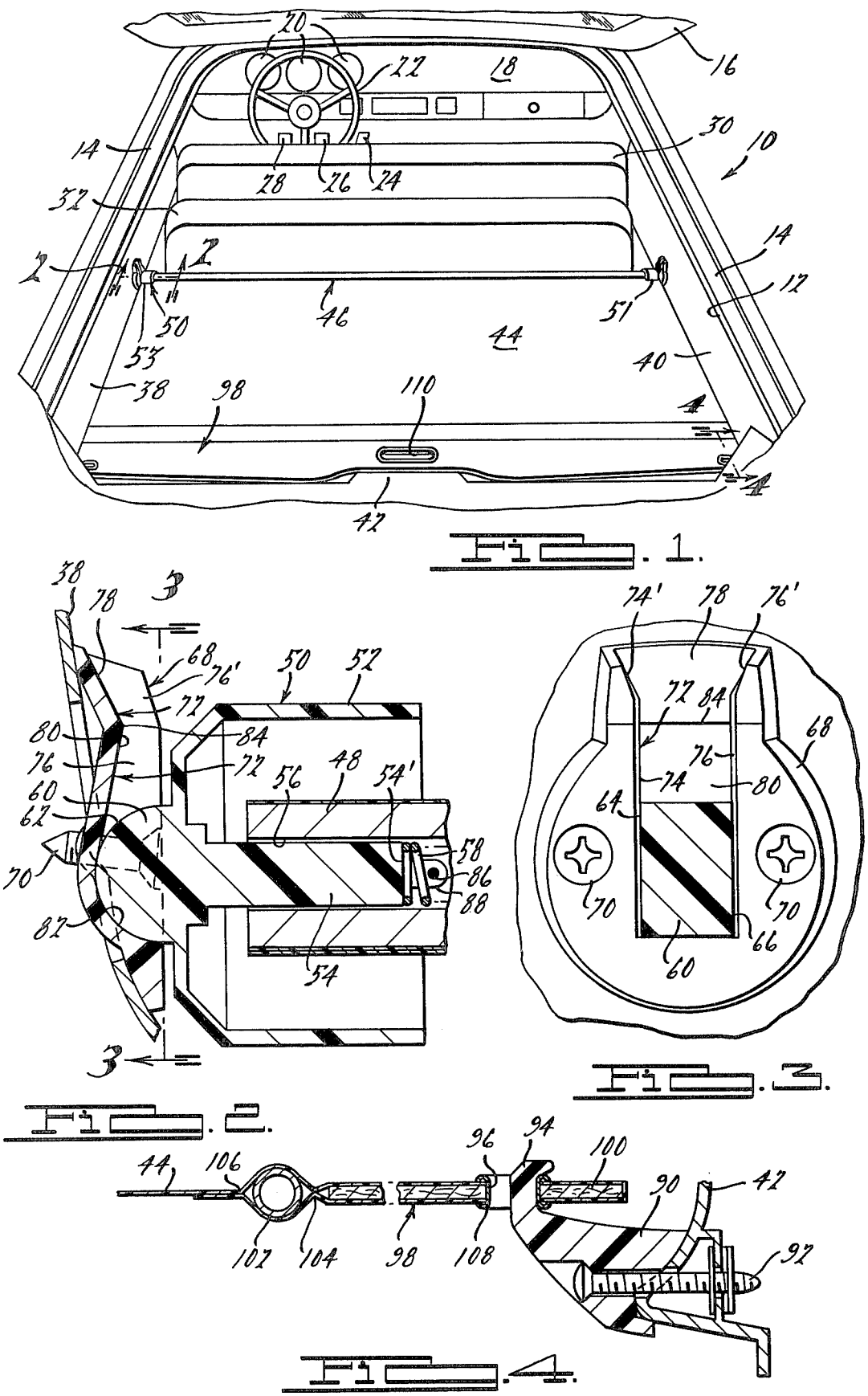

VEHICLE REMOVABLE SECURITY CURTAIN

Most security curtains for vehicle luggage compartments hereto known are of relatively rigid panel construction and hinged along one edge to permit movement away from the luggage space for access thereto. In certain applications, this type of security cover is desirable. However, a disadvantage is that convenient removal and storage of this type of security cover is difficult. In a vehicle employing a folding seat in front of the security curtain which seat can be moved to a flat non-seating condition to enlarge the cargo space, it is particularly advantageous to provide a security cover means which is compact when in the storage mode and can also be easily removed from the vehicle.

The security cover means introduced on the 1978 Chevrolet Corvette utilizes a strip of flexible material which is horizontally stretched across the top of a luggage space to provide security. The curtain is attached at one end to a roller support so that the curtain can be selectively withdrawn from its overlying relation to the luggage space. The Corvette is a two-door vehicle having only two bucket-type seats in side-by-side relation. The support for the roller and security curtain is attached to the rear wall of the luggage space and includes an elongated cylindrical member. The elongated member is attached by conventional fasteners and cannot be conveniently removed from the vehicle without tools and considerable labor. However, because of the location of the luggage space and the single row of seats in the Corvette, it is unnecessary to remove the security cover except for replacement. However, in a vehicle having a front seat, a rear seat and a luggage space behind the seats, it is desirable to provide for a folding rear seat which can be moved to a generally flat non-seating position so as to increase the luggage space. With this arrangement, it is particularly desirable to provide a security curtain which can be compactly stored and easily removed from the vehicle as desired. The subject invention describes such an arrangement and device.

Some of the features and advantages of the subject invention have been discussed and are readily understood from the aforesaid description. Further features and advantages of the present invention will be readily apparent from the reading of the following detailed description, accompanied by drawings of a preferred embodiment as follows.

IN THE DRAWINGS

FIG. 1 is a generally perspective view of the vehicle in question looking in a forward direction from the rear of the vehicle with the hatch type rear closure in an upward open position.

FIG. 2 is a sectional view of the end portions of the security curtain including the mounting means shown in FIG. 1 taken along section line 2—2 in FIG. 1 and looking in the direction of the arrows;

FIG. 3 is a sectional view of the mounting means taken along section line 3—3 in FIG. 2 and, FIG. 4 is a sectioned view of a retaining device utilized to hold the security curtain in its secured mode of operation taken along section line 4—4 in FIG. 1 and looking in the direction of the arrows.

In FIG. 1 of the drawings, an automobile 10 is illustrated. The automobile 10 is viewed from the rear thereof and has an opening 12 between frame members 14. The opening 12 is normally covered by a hinged closure 16, a portion of which is visible in FIG. 1. The closure 16 is hinged about its upper edge and connected to the upper edge portion of the opening 12. The view in FIG. 1 of the automobile through opening 12 reveals a dash panel 18, vehicle instruments identified generally by the numeral 20, a steering wheel 22, accelerator pedal 24, brake and clutch pedals 26,28, a front seat back 30, and a rear seat back 32.

In FIG. 1, the vehicle 10 has interior spaced sidewalls 38 and 40 a given distance apart and generally parallel to one another. A rear wall structure or end 42 is also visible in FIG. 1 and is located a distance behind the seat back 32 to form a cargo space therebetween and in cooperation with the walls 38 and 40. Articles placed in the cargo space are protected from view by a security curtain 44 which extends generally in a horizontal plane from a support mechanism 46. Mechanism 46 is probably best revealed in FIG. 2 and includes an elongated roller support member 48 of cylindrical form around which the security curtain 44 is wrapped when in a compact stored position. The curtain 44 consists of an elongated strip of flexible material attached at its forward end to the support 48. The support member itself is supported by end cap members 50,51 located at the left and right ends thereof. In FIG. 2, the end cap member 50 is shown in cross section. Member 50 includes an enlarged generally cup shaped portion 52 which encircles the end of the roller support 48. A horizontally extending slot 53 visible in FIG. 1 (not visible in FIG. 2) permits the security curtain 44 to extend therethrough. Member 50 also includes an integral cylindrical pin member 54 extending centrally of the cup shaped portion 52. Pin portion 54 is received in an axially extending bore 56 of the support roller 48. Shown in FIG. 2 is an end portion of a spring 58 one end of which engages the axially inward end surface 54' of pin portion 54 to urge the member 50 axially outward or to the left in FIG. 2. The functional significance of this arrangement will be more readily apparent hereinafter.

On the axially outward end of the member 50 is formed a projecting nose portion 60 which has a curved end surface 62 adapted to engage another member in sliding relation. As can be seen in FIG. 3, portion 60 also has relatively straight and parallel sidewalls 64,66 adjacent the curved end surface 62. The nose portion 60 is supported by and engages a mounting member 68 which is fastened to the sidewall 38 by fasteners 70. Likewise, end cap 51 on other end of member 48 and on the right side of the vehicle is supported by a similarly configured mounting member attached to the sidewall 40. Member 68 has a generally vertical channel 72 best shown in FIGS. 2 and 3. Channel 72 is formed by substantially parallel sidewalls 74,76 which incline slightly inward to the bottom wall of the channel. The upper end of the channel is open and formed between outwardly inclined wall portion 74' and 76'. The flat surfaces 64,66 on the projecting portion 60 are engaged in close parallelism with the walls 74,76 of the mounting member 68 to prevent rotation of member 50 with respect to mounting member 68.

The curved surface 62 of portion 60 engages the bottom wall of the channel 72. The bottom wall is configured from the open upper end with a first ramp portion 78 which extends axially inwardly with respect to the roller support 48. A second ramp portion 80 is continuous therewith and is serially in line with the first ramp portion 78 permitting the nose portion 60 to move downward in the channel 72 when the security curtain and mounting mechanism is assembled in the automobile. The second ramp portion 80 is inclined axially outward with respect to the roller support 48 and the lower end surface 82 of channel 72 has a rounded contour corresponding to surface 62. Between the first ramp surface 78 and the second ramp surface 80, a ridge portion 84 is formed intercepting the axially inwardly inclined portion and the axially outwardly inclined portion. It is now apparent that when the projecting end 60 of member 50 moves in channel 72 either during assembly or disassembly of the security curtain and support mechanism, the end cap member 50 moves axially with respect to the roller support 48 and the spring 58. The axial direction reverses upon movement past the ridge 84.

It should be noted that spring means 58 not only serves to axially load the member 50 (to the left in FIG. 2) but also provides a rotational or torsional force upon the roller support 48. This serves the function of tending to wrap the flexible material 44 about the roller support 48 toward the storage condition. The end of spring 58 is fastened to the end of portion 54 by a pin 86 extending through projecting tabs or flange portions 88. The pin 86 engages the body of spring 58 to provide a solid connection and to prevent relative rotation between the spring and the member 50. The other end of the spring 58 is similarly fashioned but to the roller support 48 so that rotation therebetween tends to torsionally wind the spring. Consequentially this provides the force upon the roller support 48 tending to wrap the security curtain 44 therearound. To maintain the security curtain in the extended position shown in FIG. 1, a hold-open or latch device is shown in FIG. 4. Specifically, a hook-like member 90 is attached to either side of the rear wall 42 by fastener 92. The member 90 includes a forwardly and upwardly extending hook portion 94 which is adapted to extend through an opening 96 through the rear edge portion 98 of the security curtain 44. The rear edge portion 98 of curtain 44 is strengthened and made more rigid than the remainder of curtain 44 by sandwiching a semi-rigid member 100 between layers of the elongated flexible material formed by turning back or reversing the edge of the material upon itself. Also, a stiffening tube 102 is provided. in a pocket formed between the layers of material 44. The layers are seen attached at 104,106 to form the pocket. The reinforcement member 104 prevents sagging of the security curtain when in the extended position shown in FIG. 1. The opening 96 is further defined by an annular metal grommet 108 which stiffens the edges around the opening. A similar opening 110 shown in FIG. 1 is centrally located to form a hand grip for extending and retracting the security curtain in a controlled manner.

We claim:

1. An easily removable security curtain and support mechanism to selectively cover a vehicle luggage space formed between spaced vehicle walls, comprising: a strip of flexible material extending over the luggage space in a generally horizontal plane when in an operative security position; an elongated roller member extending horizontally between the vehicle walls; means supporting the ends of the roller member in a manner permitting rotation thereof so that the flexible material may wrap around the roller member as it moves into a stored operative position; the end support means including a first member operatively attached to the ends of the roller member in a manner permitting both rotative and axial movement thereto and a second member adapted for fixed attachment to the spaced vehicle walls and including a generally vertical channel therein open at the upper portion and towards the first member; a nose portion of the first member with an end surface engaging a bottom channel wall of the second member as the nose portion is moved vertically in the channel during assembly and disassembly of the security curtain and support mechanism; the bottom channel wall including first and second oppositely inclined surfaces from the vertical intersecting at an axially inward ridge portion toward the end of the roller member thereby causing the first end support member to first move axially inward and then axially outward during assembly movement downward in the channel.

2. An easily removable security curtain and support mechanism to selectively cover a vehicle luggage space formed between spaced vehicle sidewalls, comprising: a strip of flexible material having a width about the distance between the spaced vehicle walls and extending horizontally across the luggage space when in an operative security position; an elongated roller member extending horizontally between the vehicle sidewalls; a roller mounting member, one attached to each end of the roller member, in a manner permitting the flexible material to wrap thereabout when put in a stored operative position; each mounting member having a nose portion axially extending from the roller member ends which includes a non-planar end surface; a receiving member, one attached to each vehicle sidewall, for supporting the roller mounting member and defining a generally vertical channel between spaced sidewalls and open to the adjacent roller mounting member and at an upper end to permit the nose portion to move downwardly into the channel; each receiving member also having a non-planar bottom channel wall against which the non-planar end surface of the hose portion slides during assembly and disassembly of the mounting member in the receiving member; the bottom wall including an inwardly inclined first ramp portion from the open upper end followed by an outwardly inclined second ramp portion and with a ridge means therebetween so that upon insertion of the nose portion downward into the channel, the mounting member first moves axially inward toward the roller member and then axially outward to prevent movement from the channel without an externally applied upward release force.

3. An easily removable security curtain and support mechanism to selectively cover a vehicle luggage space formed between spaced vehicle sidewalls, comprising: an elongated strip of flexible material having a width about the distance between the spaced vehicle walls and extending horizontally across the luggage space when in an operative security position; an elongated roller means extending horizontally between the vehicle sidewalls; a roller mounting member, one attached to each end of the roller member, in a manner permitting the flexible material to wrap thereabout when put in a stored operative position; each mounting member having a nose portion axially extending from the roller member ends which includes a curved end surface; a receiving member, one attached to each vehicle sidewall, for supporting the roller mounting member and defining a generally vertical channel between spaced sidewalls and open to the adjacent roller mounting member and at an upper end to permit the nose portion to move downwardly into the channel; each receiving member also having a bottom channel wall against which the curved end surface of the nose portion slides during assembly and disassembly of the mounting member in the receiving member; the bottom channel wall including an inwardly inclined first ramp portion from the open upper end followed by an outwardly inclined second ramp portion and with ridge means therebetween so that upon insertion of the nose portion downward into the channel, the mounting member first moves axially inward toward the roller member and then past the ridge means and axially outward into its secured position to prevent movement from the channel without an externally applied upward release force.

4. The security curtain and support mechanism of claims 1, 2 or 3 in which at least one flat axially extending surface is formed adjacent the end surface of the nose portion to engage the channel sidewalls of the receiving means to prohibit relative rotation.

5. The security curtain and support mechanism of claims 1, 2 or 3 in which the end surface of the nose portion is circularly curved and the receiving means has a closed lower end formed by a similarly circularly curved bottom surface thus providing substantially bearing contact between the mounting member and the associated receiving member.

* * * * *